United States Patent
Sun et al.

(10) Patent No.: US 9,215,543 B2
(45) Date of Patent: Dec. 15, 2015

(54) MICROPHONE MUTE/UNMUTE NOTIFICATION

(71) Applicant: CISCO TECHNOLOGY, INC., San Jose, CA (US)

(72) Inventors: Haohai Sun, Sandvika (NO); Bjorn Winsvold, Tranby (NO)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 14/095,180

(22) Filed: Dec. 3, 2013

(65) Prior Publication Data

US 2015/0156598 A1    Jun. 4, 2015

(51) Int. Cl.

| | |
|---|---|
| *H04N 7/15* | (2006.01) |
| *H04R 29/00* | (2006.01) |
| *H04L 12/18* | (2006.01) |
| *H04M 3/56* | (2006.01) |
| *G10L 25/48* | (2013.01) |
| *G06K 9/00* | (2006.01) |
| *G10L 25/78* | (2013.01) |
| *G10L 21/0216* | (2013.01) |

(52) U.S. Cl.
CPC .......... *H04R 29/008* (2013.01); *G06K 9/00221* (2013.01); *G10L 25/48* (2013.01); *H04L 12/1822* (2013.01); *H04M 3/56* (2013.01); *H04N 7/15* (2013.01); *H04R 29/004* (2013.01); *G10L 25/78* (2013.01); *G10L 2021/02166* (2013.01)

(58) Field of Classification Search
CPC ................................. H04N 7/15; H04N 7/152
USPC ............................................ 348/14.08, 14.09
See application file for complete search history.

(56) References Cited

U.S. PATENT DOCUMENTS

| | | |
|---|---|---|
| 2003/0088622 A1 | 5/2003 | Hwang et al. |
| 2007/0297682 A1* | 12/2007 | Zhang et al. ................. 382/224 |
| 2009/0002480 A1* | 1/2009 | Cutler ......................... 348/14.08 |
| 2009/0150149 A1* | 6/2009 | Culter et al. .................. 704/246 |
| 2010/0080382 A1 | 4/2010 | Dresher et al. |
| 2011/0038229 A1* | 2/2011 | Beaucoup ..................... 367/119 |
| 2011/0225247 A1* | 9/2011 | Anantharaman et al. ..... 709/206 |
| 2012/0035927 A1 | 2/2012 | Yamada et al. |
| 2012/0075407 A1* | 3/2012 | Wessling .................... 348/14.08 |
| 2014/0247319 A1* | 9/2014 | Anderson et al. ........... 348/14.08 |

(Continued)

OTHER PUBLICATIONS

U.S. Appl. No. 13/718,972, filed Dec. 18, 2012, Unknown.
U.S. Appl. No. 13/713,357, filed Dec. 13, 2012, Sun et al.

(Continued)

*Primary Examiner* — Stella L Woo
(74) *Attorney, Agent, or Firm* — Lempia Summerfield Katz LLC

(57) ABSTRACT

A processing system can include a processor that includes circuitry. The circuitry can be configured to: receive far-end and near-end audio signals; detect silence events and voice activities from the audio signals; determine whether an audio event in the audio signals is an interference event or a speaker event based on the detected silence events and voice activities, and further based on localized acoustic source data and faces or motion detected from an image; and generate a mute or unmute indication based on whether the audio event is the interference event or the speaker event. The system can include a near-end microphone array to output the near-end audio signals, one or more far-end microphones to output the far-end audio signals, and one or more cameras to capture the image of the environment.

19 Claims, 6 Drawing Sheets

(56) References Cited

U.S. PATENT DOCUMENTS

2015/0002611 A1* 1/2015 Thapliyal et al. .......... 348/14.08
2015/0085064 A1* 3/2015 Sanaullah et al. ......... 348/14.08

OTHER PUBLICATIONS

Sun et al., "Localization of Distinct Reflections in Rooms Using Spherical Microphone Array Eigenbeam Processing," Journal of Acoustical Society of America 131 (4), pp. 2828-2840, Apr. 2012.
Faller and Chen, "Suppressing Acoustic Echo in a Spectral Envelope Space," IEEE Transactions on Speech and Audio Processing, vol. 5, No. 13, 14 pages, Sep. 2005.
Berouti et al., "Enhancement of Speech Corrupted by Acoustic Noise," Proceedings of the IEEE ICASSP 4, pp. 208-211, 1979.
Martin, "Noise Power Spectral Density Estimation Based on Optimal Smoothing and Minimum Statistics," IEEE Transactions on Speech and Audio Processing, vol. 9, No. 5, pp. 504-512, Jul. 2001.
Gerkmann, "Unbiased MMSE-Based Noise Power Estimation with Low Complexity and Low Tracking Delay," IEEE Transactions on Audio, Speech, Language Processing 20, 10 pages, 2012.
Zhang et al., "Boosting-Based Multimodal Speaker Detection for Distributed Meeting Videos," IEEE Transactions on Multimedia, vol. 10, No. 8, pp. 1541-1552, Dec. 2008.
Polycom MCG Manager User's Guide VoicePlus Ediction, Version 9.0.4, DOC2235A, Aug. 2010.
Cisco TelePresence System C/SX/EX/MX/Profile Series, Software release notes TC6, D1501707, Jul. 2013.
Texas Instruments TMS320DM36x Digital Media System-on-Chip (DMSoC) Face Detection User's Guide, SPRUGG8A, Jul. 2010.
European Search Report and Written Opinion from EP Application No. 14194583.2, Apr. 28, 2015, EP.

* cited by examiner

MICROPHONE MUTE/UNMUTE NOTIFICATION

TECHNICAL FIELD

This application relates generally to mute/unmute notifications, including notifications in video conferencing devices/systems with multiple microphones.

BACKGROUND

An active speaker in a video can be identified utilizing a speaker detector. When the active speaker starts speaking while the active speaker's microphone is muted, the active speaker can be notified by an appropriate notification, displayed on a display, that the microphone is muted.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DESCRIPTION OF EXAMPLE EMBODIMENTS

Overview

Figure 1:
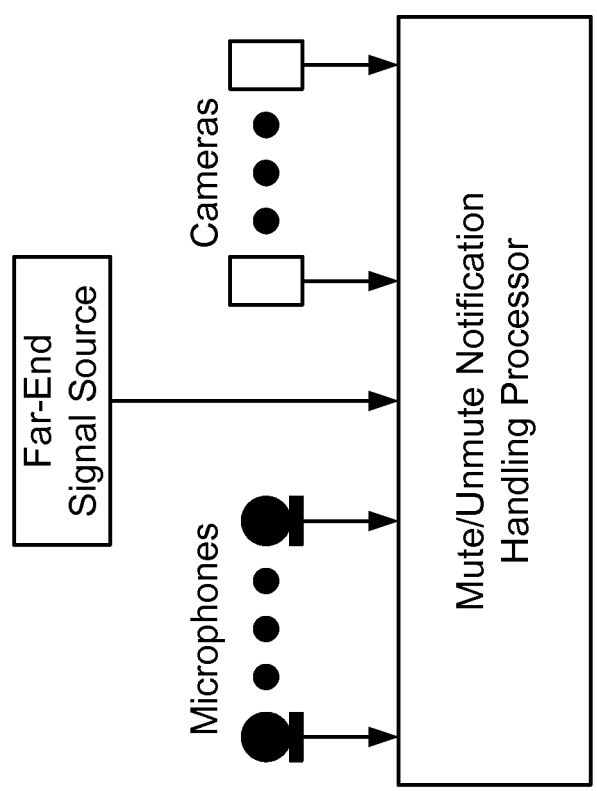
FIG. 1 is a simplified schematic illustration of hardware to perform mute/unmute notification handling according to an implementation of this disclosure.

According to one implementation, a processor includes circuitry configured to: receive far-end and near-end audio signals; detect silence events and voice activities from the audio signals; determine whether an audio event in the audio signals is an interference event or a speaker event based on the detected silence events and voice activities, and further based on localized acoustic source data and faces or motion detected from an image; and generate a mute or unmute indication based on whether the audio event is the interference event or the speaker event. The far-end and near-end signals can be with respect to a particular participant or user, and the image can include or be of the participant or user.

The circuitry can be further configured to display the mute or unmute indication. The circuitry can be configured to receive a mute or unmute operation from a user and execute a corresponding mute or unmute state change. The circuitry can be further configured to execute a mute or unmute state change corresponding to the mute or unmute indication after a predetermined amount of time has lapsed during which no mute or unmute operation from a user is received.

The circuitry can be configured to execute a mute or unmute state change corresponding to the mute or unmute without receiving a mute or unmute operation from a user.

The circuitry can be configured to generate the localized acoustic source data from the near-end audio signals by executing an acoustic source localization algorithm.

The circuitry can be configured to detect the faces or motion from the image of the environment.

The circuitry can be configured to cancel and/or suppress acoustic echo and reduce noise from the acoustic signals.

The circuitry can be configured to jointly utilize acoustic source localization, acoustic echo cancellation, noise reduction, and face detection to classify near-end events. The near-end events can include silence events, interference events, and speaker events. The circuitry can be configured to generate the mute or unmute indication based on whether a current near-end event of the near-end events is a silence event, an interference event, or speaker event.

The circuitry can be configured to: process the acoustic signals for each of a plurality of sequential short-time frames, each having a frame length of 100 ms or less, and determine a near-end event for each of the frames. The frame length can be 10 ms to 100 ms.

The circuitry can be further configured to: receive images of the environment that are captured by cameras, and detect the faces or motion in the images.

The circuitry can be configured to: receive the near-end acoustic signals from an array of microphones, and determine sound source positions, as the localized acoustic source data, from the near-end acoustic signals.

In one implementation, a processing system can include a processor including circuitry configured to: receive far-end and near-end audio signals; detect silence events and voice activities from the audio signals; determine whether an audio event in the audio signals is an interference event or a speaker event based on the detected silence events and voice activities, and further based on localized acoustic source data and faces or motion detected from an image; and generate a mute or unmute indication based on whether the audio event is the interference event or the speaker event. The system can include a near-end microphone array to output the near-end audio signals, one or more far-end microphones to output the far-end audio signals, and one or more cameras to capture the image of the environment. The far-end and near-end signals can be with respect to a particular participant or user, and the image can include or be of the participant or user.

The processing system can include a display to display the mute or unmute indication.

The processing system can also include a user-interface to accept a user operation to change a mute or unmute state of the processing system. For example, a touch-screen, mouse, keyboard, or remote control can be provided to accept the user operation.

A method according to one implementation includes: receiving far-end and near-end audio signals; detecting silence events and voice activities from the audio signals; determining whether an audio event in the audio signals is an interference event or a speaker event based on the detected silence events and voice activities, and further based on localized acoustic source data and faces or motion detected from an image; and generating a mute or unmute indication based on whether the audio event is the interference event or the speaker event. The far-end and near-end signals can be with respect to a particular participant or user, and the image can include or be of the participant or user.

A non-transitory computer-readable medium including computer-executable instructions that, when executed by computer processor, causes the computer processor to execute the method. Steps of the method or a corresponding computer process can be executed by various means, including encoding, converting, decoding, processing, transmitting, and receiving means that correspond to computer hardware components or computer hardware components that are configured by computer software or computer code.

DETAILED DESCRIPTION OF EXEMPLARY IMPLEMENTATIONS

In the drawings, like reference numerals designate identical or corresponding parts throughout the several views. Further, as used herein, the words "a," "an" and the like generally carry a meaning of "one or more," unless stated otherwise.

Aspects of this disclosure relate to video conferencing systems and telepresence systems. However, the teachings of this disclosure are not limited to such systems.

Video conferencing and telepresence systems may include a codec. A codec is coder-decoder that processes data, especially digital data. In the case of video conference and telepresence systems, the codec codes and decodes audio and video data. Raw audio and video data may include digital or analog signals. The codec can process or code the analog signals into digital signals.

The codec can be implemented by one or more processors or circuits, and the processors or circuits can be distributed or centrally located in a single device. The codec can also include mute/unmute circuitry for one or more microphones connected thereto for primary audio communication. The codec can also include audio-tracking (i.e., source-tracking or speaker-tracking) circuitry to detect audio sources from audio signals from one or more microphone arrays.

According to aspects of this disclosure, during a video conference session, if a participant does not speak for a while and forgets to mute the microphone, but the speaker's environment is noisy (caused by interferences such as keyboard typing, mouse clicking, furniture moving, colleague speaking, etc.), then a system is able to detect the interferences, and then either notify the participant to mute the microphone manually or mute the corresponding audio line automatically. On the other hand, when in a call, if the participant starts speaking while the microphone is muted, the conferencing system is able to detect this active speaker event, and then either notify the participant to unmute the microphone manually or unmute corresponding line automatically.

The teachings of this disclosure address various issues identified by the inventors.

For example, a conference participant may sit in a shared office (or in an office that is not well sound insulated), and when other people nearby are talking, they can also be detected as active speakers. In this case, on one hand, if the microphone is muted, then system could generate a wrong unmute reminder (false alarm). On the other hand, if the microphone is unmuted, then the system will not generate any mute reminder even if the real conference participant stops talking (missed alarm). Aspects of this disclosure address this issue.

Further, if a conferencing system is working in a hands-free mode and an acoustic echo canceller cannot cancel an acoustic echo (e.g., a loudspeaker feedback) completely, the echo residual may trigger the above-discussed issue as well. Accordingly, aspects of this disclosure also address this issue.

If interference signals in an environment have a similar property as speech signals, then these interferences may cause false/missed alarms. Aspects of this disclosure address this issue.

When SNR (signal-to-noise ratio) and SRR (signal-to-reverberation ratio) of a captured single-channel audio signal are low, current solutions can lead to many false/missed alarms. Aspects of this disclosure address this issue.

Generally, excessive false/missed alarms in a system will definitely degrade user experience. Aspects of this disclosure address this issue.

Audio/video conferencing devices can integrate multiple microphones (a microphone array) with spatial filtering and acoustic source localization functionalities (for acoustic interference suppression, camera steering, camera focusing, etc.). Other intelligent functionalities such as face detection, acoustic echo cancellation, background noise reduction, speech activity detection, etc. can also be provided.

Aspects of this disclosure pertain to combining corresponding functional modules/circuits to manage mute/unmute notifications and operations to address at least the above-discussed issues.

FIG. 1 is a simplified schematic illustration of hardware to perform mute/unmute notification handling according to an implementation of this disclosure. In FIG. 1, an array of microphones and an array of cameras input corresponding audio and video signals to a mute/unmute notification handling processor. One or more microphones and one or more cameras can be provided, and these input devices can be considered near-end input devices (i.e., near-end microphones and cameras) with respect to a user/participant. Specifically, a microphone array and/or microphones are primarily used for the user/participant with respect to the near-end. A near-end speaker tracking system or near-end primary audio microphones can be provided.

The processor also receives a far-end audio signal from a far-end signal source. The far-end is considered relative to the user/participant. The far-end signal source can incorporate microphones of, e.g., a far-end speaker tracking system or can incorporate far-end primary audio microphones. Generally, a far-end signal is an audio or speech signal from one or several far-end users. The corresponding audio signals are captured by one or more microphones at the far-end, and encoded to audio streams by far-end codecs/endpoints. The audio streams are then transmitted to a near-end codec, and the near-end codec decodes the audio streams to audio signals (far-end audio signals). The far-end audio signals are then played back by loudspeakers or headphones at the near-end. The played-back sound can be captured by near-end microphones, and consequently transmitted back to the far-end, so the far-end user hears an echo. This echo can be suppressed or canceled utilizing acoustic echo cancellation (AEC) and/or acoustic echo suppression (AES), where the far-end audio signals can be used at the near-end as references for acoustic echo cancellation/suppression.

FIG. 1 shows input signals of an implementation, where the corresponding system includes far-end signal channels, which can be provided by an array of microphones, and one or more cameras. The far-end signal channels are used as references for acoustic echo cancellation/suppression and echo residual detection. The multi-microphone array is used to capture a spatial acoustic scene, analyze various audio signals, and detect audio source positions in space. The one or more cameras detect speaker positions using face detection approaches/algorithms to recognize faces in images. The far-end and near-end signals can be with respect to a particular participant or user, and the one or more cameras can take one or more images, where the images can be of the participant or user.

Figure 2:
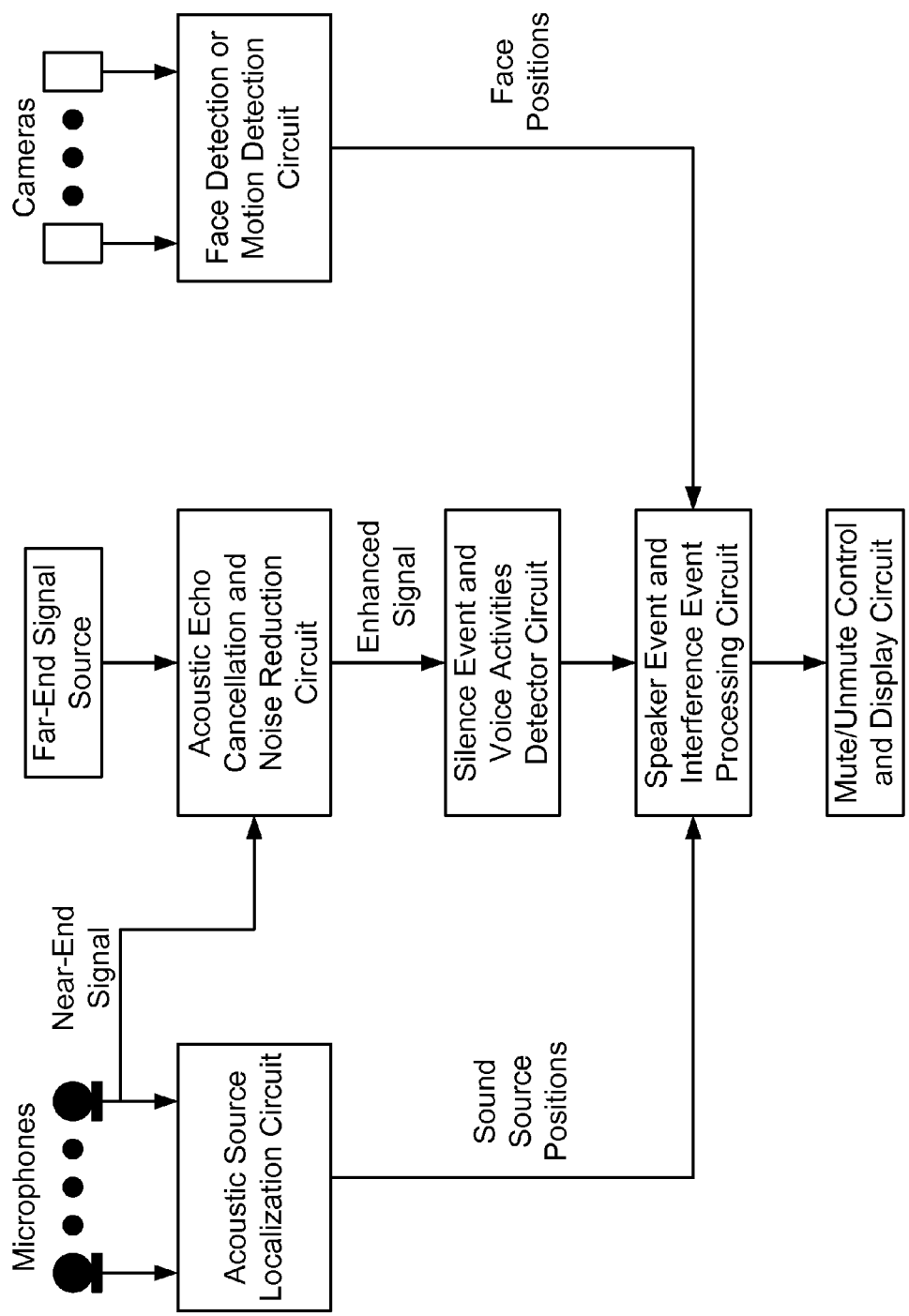
FIG. 2 is a schematic illustration of hardware and circuitry to perform speaker and interference event processing for mute/unmute notifications.

FIG. 2 is a schematic illustration of hardware and circuitry to perform speaker and interference event processing. The hardware and processing flow illustrated in FIG. 2 can be utilized for near-end event classification. For example, three near-end events (silence, interference and speaker) are detected, and a background noise level is estimated in an acoustic echo cancellation and noise reduction circuit. This circuit can execute algorithms for acoustic echo cancellation (AEC) and/or acoustic echo suppression (AES).

In FIG. 2, the acoustic echo cancellation and noise reduction circuit receives a far-end audio signal from a far-end signal source and a near-end audio signal from one or more near-end microphones. Based on these signals, the circuit generates an enhanced signal that is input to a silence event and voice activities detector circuit. An output of the silence event and voice activities detector circuit is input to a speaker event and interference event processing circuit.

The one or more microphones output audio signals to an acoustic source localization circuit that calculates/determines sound source positions. An output of this circuit (i.e., sound source positions) is input to the speaker event and interference event processing circuit.

One or more cameras output video signals to a face detection or motion detection circuit, which calculates/determines face positions. An output of this circuit (i.e., the face positions) is input to the speaker event and interference event processing circuit.

The speaker event and interference event processing circuit, based on the above-discussed inputs, executes an algorithmic process to determine whether an event is an interference event or a speaker event (or a silence event). In one implementation, the process includes determining whether a sound source position is in a desired region and matched with a face position, and whether a voice activity is detected. If the determination is positive (i.e., a yes), then the circuit determines the event is a speaker event. If the determination is negative (i.e., a no), then the circuit determines the event is an interference event.

An output of the speaker event and interference event processing circuit (i.e., an indication of an interference event or a speaker event) is input to a mute/unmute control and display circuit. This circuit controls whether a particular microphone or particular microphones (or channel/channels) are muted or unmuted on the basis of the determined event. This circuit also controls a mute/unmute notification display on a particular monitor associated with the one or more microphones and/or a corresponding speaker/user.

FIG. 2 illustrates an implementation on how to jointly use acoustic source localization, acoustic echo cancellation, noise reduction, and face detection to classify near-end events. Three near-end events (silence, interference and speaker) are detected, and the background noise level is estimated in a noise reduction module/circuit.

Audio signals processing algorithms are conducted for each short-time framed audio signal. A frame length may be from 10 milliseconds (ms) to 100 milliseconds (ms). Frames may be sequential or overlapping by, e.g., 1-2 ms or more.

The microphone array is used to capture a spatial acoustic scene and detect audio source positions in space. Various acoustic source localization algorithms, e.g. SRP-PHAT, steered beamforming, sub-space methods, and microphone-pair phase-difference estimation, can be used to locate distinct acoustic sources in a room acoustical environment. The output of the acoustic source localization circuit includes sound source positions.

The cameras in the system detect speaker positions using face detection approaches. Various face-detection algorithms can be utilized, including commercial solutions, which can provide robust and real-time face detection and tracking. The output of the face detection or motion detection circuit includes positions of motion and/or face positions.

Far-end signal channels are used for acoustic echo cancellation/suppression and echo residual detection. Single or multiple-channel echo cancellation/suppression solutions can be utilized. The output of an acoustic echo cancellation and noise reduction circuit includes an audio signal where an acoustic echo signal is removed effectively and/or completely, while near-end sound signals are well preserved.

However, in practice, due to echo path changing or non-linearity problems, some acoustic echo signals may not be able to be removed completely. Such echo residual signals can be by incorrectly treated as near-end speech and lead to false sound event classification. To resolve this issue, according to the teachings of this disclosure, a cross-correlation (CC) is calculated between the echo canceller/suppressor output signal and the far-end signal. The CC is computed for each short-time frame.

If the maximum value in the CC function is higher than a threshold, then it is determined there are some echo residual signals mixed in the echo canceller/suppressor output, and in this case, the frame is neglected for the near-end sound event classification.

The noise reduction circuit is further utilized to suppress stationary noise (background noise, microphone self-noise, etc.), enhance the near-end non-stationary sound signals, and estimate the noise level of the microphone signals.

After acoustic echo cancellation/suppression and noise reduction, voice activity detection (VAD) algorithms are used to detect near-end voice activities (VA). For a frame, VAD is the true means voice signal or a mixture of voice signal and interference is present in this frame. Other than VAD, a sound activity detection (SAD) algorithm, which detects all non-silent (non-silence) frames, is also utilized. If the signal level of a frame is higher than $\alpha$*(stationary_noise_level), where a is a weighting factor, then SAD for the frame is true. That is, the frame contains either voice signal or non-voice sound signal or a mixture of voice and non-voice sound signals. If the signal level of a frame is lower than $\alpha$*(stationary_noise_level), then SAD for the frame is false. That is, the frame is a silence frame.

By combining all of the information (sound source position, face position, VAD, SAD, residual echo detection, stationary noise level estimation) discussed above, the near-end sound events can be classified as a silence event, speaker event, and interference event in accordance with the following exemplary algorithm.

First, run VAD and SAD algorithm.

If SAD=false, then it is a silence event.

If SAD=true and VAD=false, then it is an interference event.

If SAD=true and VAD=true, then get the sound source position from the acoustic source localization circuit, and if sound source position is outside of the region of interest, then it is an interference event.

If SAD=true and VAD=true, then get the sound source position from the acoustic source localization algorithm, and if sound source position is inside the region of interest, then get the face position from the face detection circuit. If the sound source position is not consistent with the face position, then it is an interference event.

If SAD=true and VAD=true and sound source position is inside the region of interest and the sound source position is consistent with the face position, then it is a speaker event.

Figure 3:
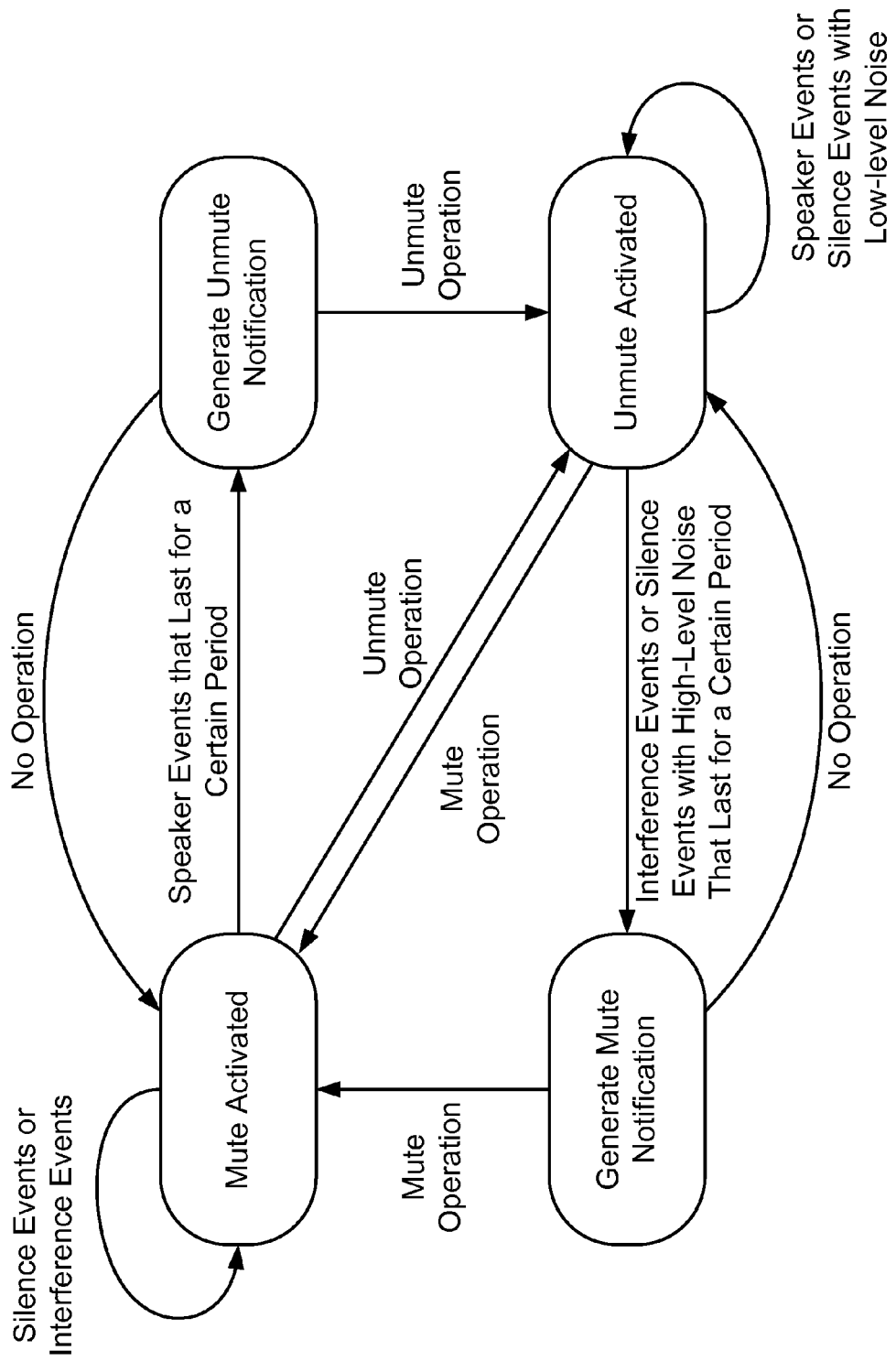
FIG. 3 is an illustration of a finite state machine for mute/unmute control.

FIG. 3 is an illustration of a finite state machine (FSM) for mute/unmute control with respect to how corresponding control circuitry operates in one implementation. Such control circuitry can be, e.g., the mute/unmute control and display circuit illustrated in FIG. 2.

For purposes of discussion, the following presumes an initial state of mute being activated. It should be appreciated an initial state can also be one where the mute is not activated, which can be referred to as an unmute being activated.

In FIG. 3, the mute is activated and silence and/or interference events result in the mute continuing to be activated. If an unmute operation is executed by, e.g., a user terminal/remote, then the unmute is activated. Also, if speaker events are detected/determined and they are detected/determined to last for at least a certain period of time (i.e., a predetermined period of time; threshold value period of time), then an unmute notification is generated. The notification can be displayed on a corresponding monitor or terminal for the speaker corresponding to the speaker event.

The speaker can then either manually enter an unmute operation, which proceeds to the unmute being activated, or not execute the unmute operation, which causes the mute to remain activated. In another implementation, the control circuit can determine whether the speaker events continue for a further period of time or increase in volume, and if so, then the unmute operation can be entered by the control circuit without manual operation by the speaker. A corresponding unmute notification can be generated to indicate that this automated process by the control circuit has been executed.

When the unmute is activated, the unmute continues to be active when speaker events are detected or when silence events are detected with a relatively low-level noise. A low-level noise is a noise level that is determined to not be substantially noticeable (or is able to be filtered) so as not to interfere with primary audio. Various thresholds can be established to define a low-level of noise.

A speaker can manually enter a mute operation, which will result in the mute being activated. Further, when interference events or silence events with high-level noise are detected/determined to last for at least a certain period of time (i.e., a predetermined period of time; threshold value period of time), then a mute notification is generated. The notification can be displayed on a corresponding monitor or terminal for the speaker corresponding to the high-level noise or interference event.

A high-level noise is a noise level that is determined to be substantially noticeable (or is unable to be filtered) such that it interferes with primary audio. Various thresholds can be established to define a high-level of noise.

The speaker can then either manually enter a mute operation, which proceeds to the mute being activated, or not execute the mute operation, which causes the unmute to remain activated. In another implementation, the control circuit can determine whether the interference or high-level noise events continue for a further period of time or increase in volume, and if so, then the mute operation can be entered by the control circuit without manual operation by the speaker. A corresponding mute notification can be generated to indicate that this automated process by the control circuit has been executed.

In the FSM of FIG. 3, in one implementation, the information and events obtained from FIG. 2 are utilized to obtain near-end event classification results and stationary noise levels are used to trigger the state changes in this FSM. In one implementation, some other functionalities, such as motion detection, speaker recognition, and face recognition, etc., can also be used to further improve the performance and intelligence of the system.

According to aspects of this disclosure, at least the following effects can be achieved:

(1) Implementations in accordance with this disclosure are not limited to exploring only single-channel sound properties to make a decision, but also the information from a spatial acoustic field, far-end signal, and camera face detection.

(2) Implementations in accordance with this disclosure are much more intelligent and have fewer false/missed alarms than prior-art solutions.

(3) Implementations in accordance with this disclosure can be achieved by modifying the functionalities of an existing video conferencing system or corresponding circuits/devices, where the computational complexity can be fairly low to implement the modifications.

Aspects of this disclosure can be implemented in, e.g., audio/video conferencing devices with microphone arrays.

A sound event detection combined with face information verification, in accordance with the teachings herein, can also be utilized in surveillance and security products to, e.g., detect intrusive events.

Generated acoustic events and reminder information can also be sent to a multipoint control unit (MCU) for centralized mute/unmute management amongst a plurality of different endpoints or terminals, which may be locally or remotely distributed across a network. This can be utilized to conference security monitoring. Displays can be provided at a centralized location, where cameras and speakers can be respectively distributed across a plurality of different locations.

Aspects of this disclosure pertain to a multimodal speaker detection (combining voice, facial, motion, etc. features) system, and one exemplary implementation includes a microphone array and five cameras. The system was used to detect all active speakers in a meeting room (360-degree panorama), and provided far-end users with a close-up of the current speaker.

Aspects of this disclosure are directed to detecting an active speaker in a predefined region (interested region). All the other speakers sitting OUTSIDE of this region are considered as INTERFERENCES even though their voice, face, and motion features are matched very well. For instance, the conference participant may sit in a shared office and use a personal video conferencing device. When other people nearby are talking, using traditional multimodal speaker detection techniques, they will be detected as active speakers as well. In this case, on one hand, if the microphone is muted, then the system could generate a wrong unmute reminder (false alarm), and on the other hand, if the microphone is unmuted, then the system will not generate any mute reminder even if the real conference participant stops talking (missed alarm). This situation can be avoided by implementing the teachings of this disclosure.

Besides a microphone array and cameras, the proposed hardware system also contains a far-end signal channel, as in FIGS. 1-2, which is used for robust acoustic echo control, and echo residual removal. This functionality can be crucial, in some practical implementations, where when the far-end user is talking, directions of arrival of the echo signal and its reflections in the near-end overlap with a direction of the near-end speaker's face. This leads to frequent false alarms. This issue is addressed by implementing the teachings of this disclosure.

With reference to the mute/unmute FSM of FIG. 3 and the near-end event classification results described herein, state changes can be triggered in the FSM. However, in conventional multimodal techniques, all of the active speakers in a meeting room are detected, and the techniques cannot be directly applied to this FSM. This issue is addressed by implementing the teachings of this disclosure.

A near-end sound event classification algorithm in accordance with aspects of this disclosure is different from traditional multimodal speaker detection techniques. Prior multimodal techniques aim to detect all active speakers in an environment, without specifically considering an interested region, robust acoustic echo control issues, and/or application of the detection results to a mute/unmute FSM.

Figure 4:
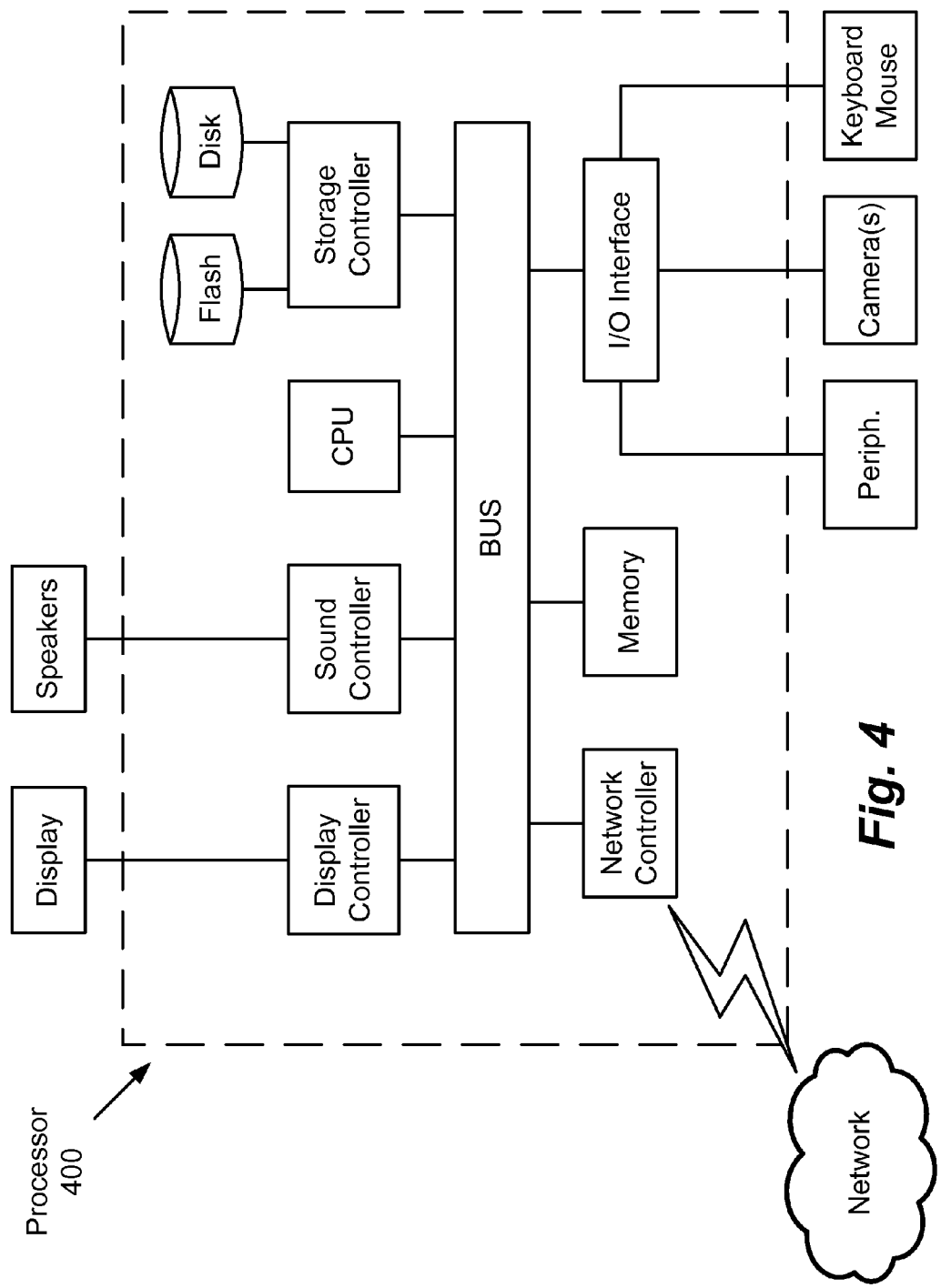
FIG. 4 is a schematic illustration of a processor.
Figure 5:
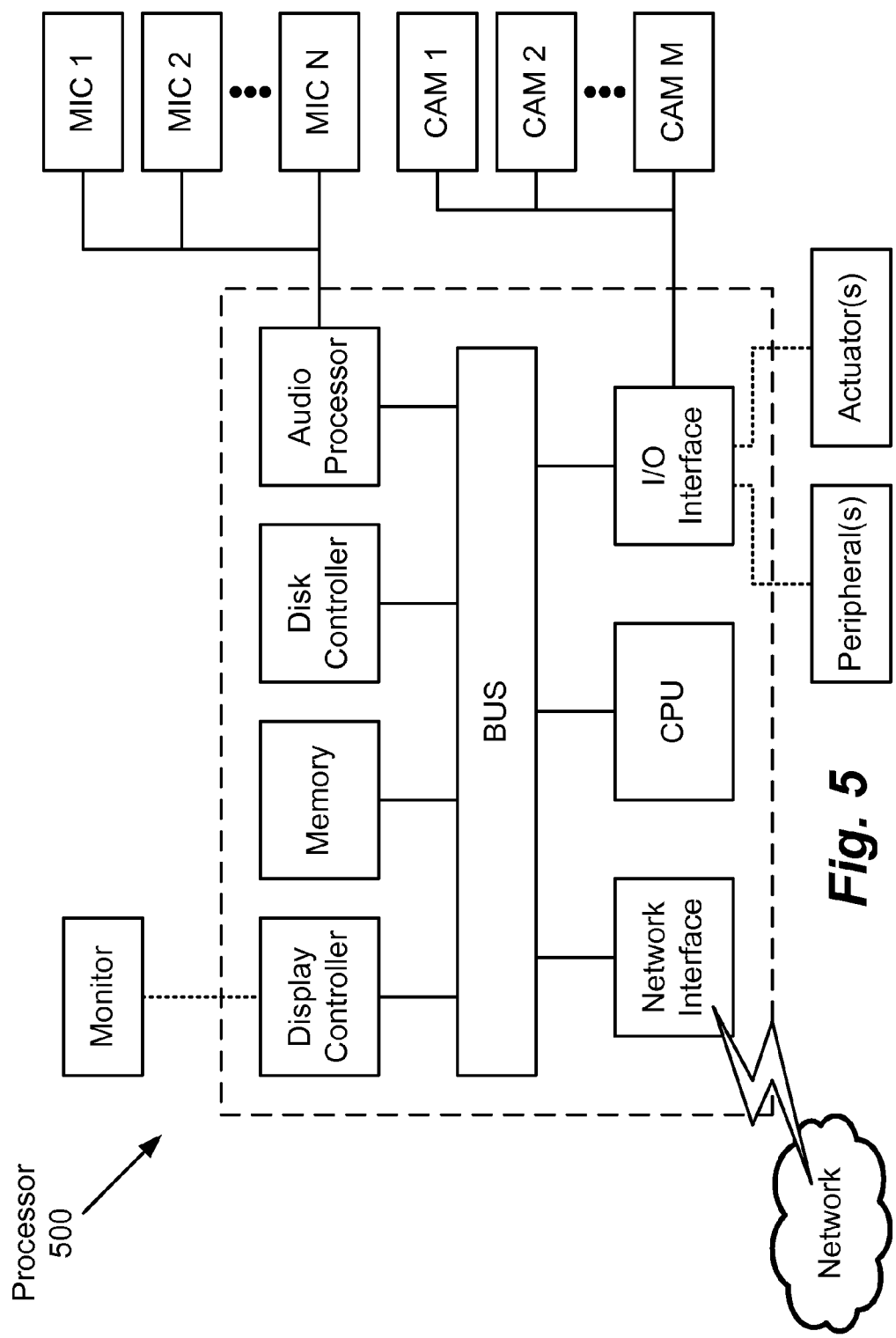
FIG. 5 is a schematic illustration of another processor.

Each of FIGS. 4 and 5 illustrates an exemplary processing system or processor 400/500. One or more of such processors can be utilized in or to execute one or more algorithms, or portions thereof, or one or more architecture blocks, or portions thereof, in accordance with the descriptions provided herein. For example, these processors illustrate computerized systems or circuits that implement the various algorithms and functions described herein. However, exemplary implementations may not include all of the hardware structures illustrated in these figures, as corresponding function may not be desired in all implementations.

The exemplary processors can be implemented using one or more microprocessors or the equivalent, such as a central processing unit (CPU), at least one application specific processor ASP (not shown), circuitry and/or one or more other circuits. The microprocessor is a circuit that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can control a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a system, method or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs and other memory devices.

In FIG. 4, processor 400 can be embodied, in an exemplary implantation by a computer system of conventional hardware architecture that has been modified by programming to execute the algorithms described herein. The processor 500 of FIG. 5 can be similarly embodied.

In one implementation, the processor 400 is separate from the processor 500. In another implementation, the processors 400 and 500 are integrated into a single machine. Further, aspects of the processors 400 and 500 can be distributed among a plurality of networked computer hardware components or circuits. In FIG. 5, the processor 500 is illustrated as connected to a plurality of microphones and cameras. These microphones can be grouped into two sets: one for audio tracking purposes to provide an audio-tracking microphone array; and another for audio communication purposes to provide audio communication microphones. Respective far-end and near-end audio sources can be defined with respect to a participant/user and corresponding far-end and near-end audio-tracking systems and primary audio systems (i.e., microphone arrays or one or more microphones). Although one audio processor is illustrated in FIG. 5, multiple audio processors can be provided, such as one or one group of processors dedicated for audio tracking and one or one group of processors dedicated for audio communication purposes.

Figure 6:
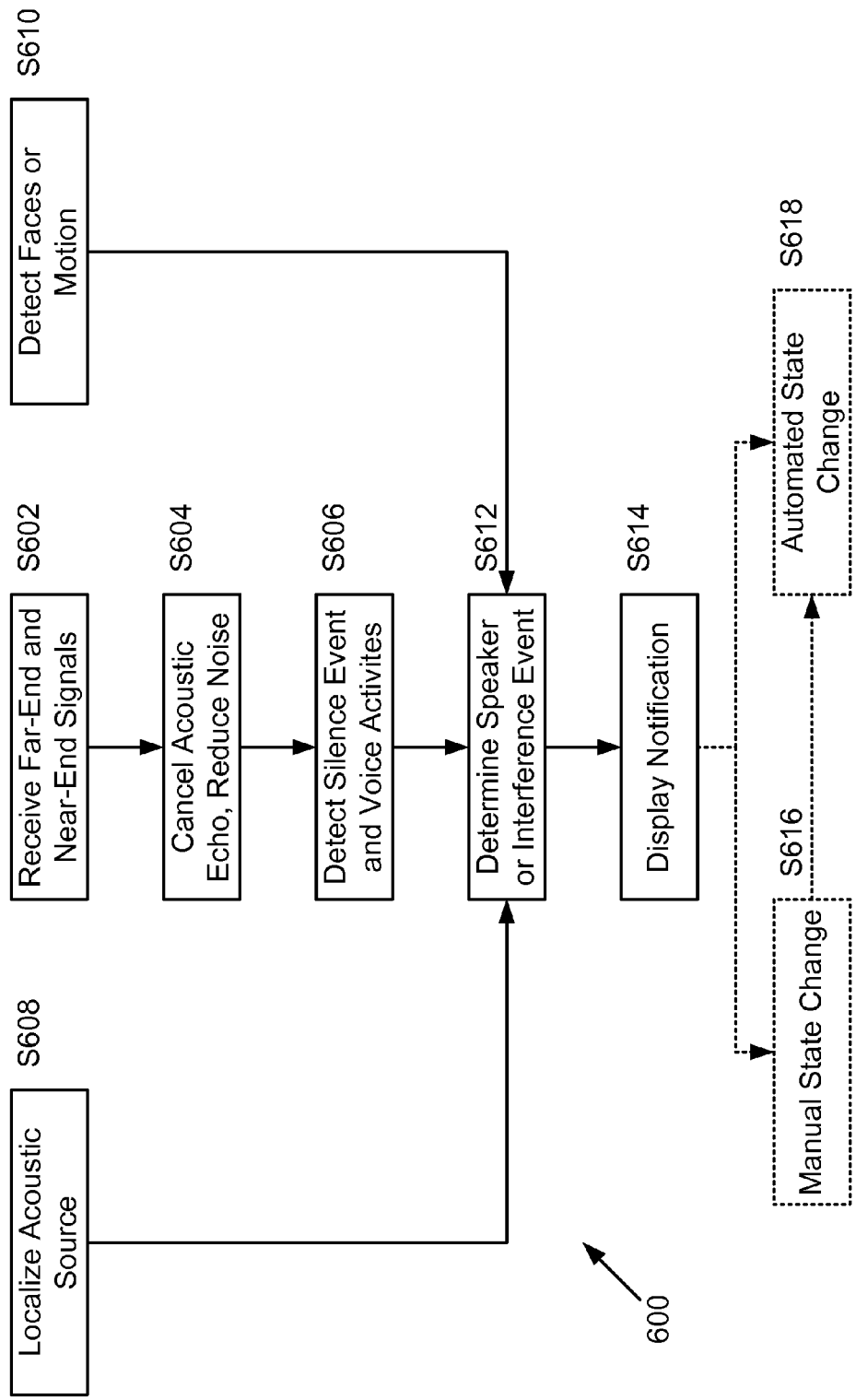
FIG. 6 is a flowchart illustration of an exemplary algorithm.

FIG. 6 illustrates an exemplary algorithm 600 for outputting a notification and/or automating a state change by a processor or circuit, by way of a flow chart, that corresponds to the processing and hardware described via one or more of the exemplary processors illustrated in FIGS. 4-5.

In FIG. 6, a processor (e.g., a codec or control circuitry) receives far-end and near-end signals at S602. At S604, acoustic echo cancellation (AEC) is executed and noise is reduced by the processor. Silence and voice activity events are detected at S606.

At S608, which can be executed at the same time as S602-S606, acoustic sources are localized. At S610, faces and/or motion are detected.

Based on detected faces/motion, localized acoustic sources, and detected silence events and voice activities, a speaker or interference event (or silence event) is determined at S612. An notification of mute/unmute, based on the determination in S612) is displayed at S614. A manual state change (i.e., mute or unmute) by a speaker/operator can be executed at S616. In one implementation, a state change (i.e., mute or unmute) can be automatically executed at S618 based of predetermined variables and criteria being met, in accordance with the descriptions provided herein. S618 can be implemented so as to bypass the manual operation at S616, and S618 can also be implemented to be executed when no manual operation at S616 is received within a predetermined amount of time.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A processor, comprising circuitry configured to:
receive far-end and near-end audio signals;
detect voice activities from the audio signals using a voice activity detection algorithm;
detect sound activities from the audio signals using a sound activity detection algorithm;
detect a sound position from the audio signals using an acoustic source localization algorithm;
receive data indicative of a region of interest;
when the voice activity detection algorithm indicates voice activities at a same time that the sound activity detection algorithm indicates sound activities, determine whether the sound position is in the region of interest;
determine that an audio event in the audio signals is an interference event in response to the sound position being outside of the region of interest; and
generate a mute or unmute indication based on whether the audio event being the interference event.

2. The processor according to claim 1, wherein the circuitry is further configured to display the mute or unmute indication.

3. The processor according to claim 2, wherein the circuitry is further configured to receive a mute or unmute operation from a user and execute a corresponding mute or unmute state change.

4. The processor according to claim 3, wherein the circuitry is further configured to execute a mute or unmute state change corresponding to the mute or unmute indication after a predetermined amount of time has lapsed during which no mute or unmute operation from a user is received.

5. The processor according to claim 2, wherein the circuitry is further configured to execute a mute or unmute state change corresponding to the mute or unmute without receiving a mute or unmute operation from a user.

6. The processor according to claim 1, wherein the region of interest is defined by a face detection circuit that detects faces from an image of the environment.

7. The processor according to claim 1, wherein the circuitry is further configured to cancel and/or suppress acoustic echo and reduce noise from the acoustic signals.

8. The processor according to claim 1, wherein the circuitry is further configured to jointly utilize acoustic source localization, acoustic echo cancellation, noise reduction, and face detection to classify near-end events.

9. The processor according to claim 8, wherein the near-end events include silence events, interference events, and speaker events.

10. The processor according to claim 9, wherein the circuitry is configured to generate the mute or unmute indication based on whether a current near-end event of the near-end events is a silence event, an interference event, or speaker event.

11. The processor according to claim 1, wherein the circuitry is configured to:
process the acoustic signals for each of a plurality of sequential short-time frames, each having a frame length of 100 ms or less, and
determine a near-end event for each of the frames.

12. The processor according to claim 11, wherein the frame length is 10 ms to 100 ms.

13. The processor according to claim 1, wherein the circuitry is further configured to:
receive images of the environment that are captured by cameras, and
detect the faces or motion in the images.

14. The processor according to claim 1, wherein the circuitry is further configured to:

receive the near-end acoustic signals from an array of microphones, and determine sound source positions, as the localized acoustic source data, from the near-end acoustic signals.

15. The processor according to claim 1, wherein the circuitry is further configured to:

determine that an audio event in the audio signals is a speaker event in response to the sound position being inside of the region of interest.

16. A processing system, comprising:

a processor including circuitry configured to:

receive far-end and near-end audio signals;

detect voice activities from the audio signals using a voice activity detection algorithm;

detect sound activities from the audio signals using a sound activity detection algorithm;

detect a sound position from the audio signals using an acoustic source localization algorithm;

receive data indicative of a region of interest;

when the voice activity detection algorithm indicates voice activities at a same time that the sound activity detection algorithm indicates sound activities, determine whether the sound position is in the region of interest;

determine that an audio event in the audio signals is an interference event in response to the sound position being outside of the region of interest; and generate a mute or unmute indication based the audio event being interference event, a near-end microphone array to output the near-end audio signals, one or more far-end microphones to output the far-end audio signals, and one or more cameras to capture the image of the environment including the region of interest.

17. The processing system according to claim 16, further comprising:

a display to display the mute or unmute indication.

18. The processing system according to claim 16, further comprising:

a user-interface to accept a user operation to change a mute or unmute state of the processing system.

19. A method, comprising:

receiving far-end and near-end audio signals;

detecting voice activities from the audio signals using a voice activity detection algorithm;

detecting sound activities from the audio signals using a sound activity detection algorithm;

detecting a sound position from the audio signals using an acoustic source localization algorithm;

receiving data indicative of a region of interest;

when the voice activity detection algorithm indicates voice activities at a same time that the sound activity detection algorithm indicates sound activities, determining whether the sound position is in the region of interest;

determining that an audio event in the audio signals is an interference event in response to the sound position being outside of the region of interest; and generating a mute or unmute indication based on the audio event being the interference event.

* * * * *